US008168708B2

(12) United States Patent
Pulina et al.

(10) Patent No.: US 8,168,708 B2
(45) Date of Patent: May 1, 2012

(54) SHEET-FED OFFSET PRINTING INKS AND VARNISHES COMPRISING NEW SOLVENTS

(75) Inventors: Tillmann Pulina, Nidderrau-Heldenbergen (DE); Christian Johnke, Frankfurt am Main (DE)

(73) Assignee: Sun Chemical Corporation, Parsipanny, NJ (US)

( * ) Notice: Subject to any disclaimer, the term of this patent is extended or adjusted under 35 U.S.C. 154(b) by 0 days.

(21) Appl. No.: 12/438,610

(22) PCT Filed: Aug. 24, 2007

(86) PCT No.: PCT/US2007/076751
§ 371 (c)(1),
(2), (4) Date: Dec. 22, 2009

(87) PCT Pub. No.: WO2008/024968
PCT Pub. Date: Feb. 28, 2008

(65) Prior Publication Data
US 2010/0174020 A1  Jul. 8, 2010

Related U.S. Application Data

(60) Provisional application No. 60/840,243, filed on Aug. 25, 2006.

(51) Int. Cl.
C09D 11/02 (2006.01)
(52) U.S. Cl. ....................................... 524/313
(58) Field of Classification Search .................. 106/31; 523/160, 161; 524/313
See application file for complete search history.

(56) References Cited

U.S. PATENT DOCUMENTS

| | | | |
|---|---|---|---|
| 2,389,781 | A | 11/1945 | Isenberg |
| 3,665,060 | A | 5/1972 | Bergomi, Jr. et al. |
| 4,627,876 | A | 12/1986 | Fries et al. |
| 5,122,188 | A | 6/1992 | Erhan et al. |
| 5,507,864 | A | 4/1996 | Jaeger et al. |
| 5,965,633 | A | 10/1999 | Revol |
| 6,176,914 | B1 | 1/2001 | Feustel et al. |
| 6,284,720 | B1 | 9/2001 | Opre |
| 6,613,813 | B1 | 9/2003 | Borgmann et al. |
| 6,932,465 | B2 | 8/2005 | Nito et al. |
| 2004/0028640 | A1 | 2/2004 | Arnaud et al. |
| 2004/0086603 | A1 | 5/2004 | Shastry et al. |
| 2005/0131103 | A1 | 6/2005 | Hassan et al. |
| 2005/0250875 | A1 | 11/2005 | Marr et al. |

FOREIGN PATENT DOCUMENTS

| | | |
|---|---|---|
| DE | 2118785 | 10/1972 |
| DE | 69114281 | 6/1996 |
| DE | 69114281 T2 | 6/1996 |
| DE | 19516028 A1 | 11/1996 |
| DE | 69601706 | 10/1999 |
| DE | 69601706 T2 | 10/1999 |
| DE | 10209013 A1 | 10/2003 |
| EP | 1338630 | 8/2003 |
| JP | 09157508 | 12/1995 |
| JP | 2000159867 | 11/1998 |
| JP | 11-5363 | 1/1999 |
| JP | 2002121452 | 8/2002 |
| JP | 2003064284 | 3/2003 |
| JP | 2004-307555 | 11/2004 |
| WO | WO 2004/003089 | 1/2004 |
| WO | WO2005042655 | 5/2005 |
| WO | WO2005044924 A1 | 5/2005 |
| WO | WO 2005/090498 | 9/2005 |
| WO | WO2005090498 | 9/2005 |
| WO | WO2005090498 A1 | 9/2005 |

OTHER PUBLICATIONS

Coconut Oil (http://en.wikipedia.org/wiki/Coconut_oil), Jan. 18, 2011, pp. 1-5.*
International Search Report and Written Opinion issued for International Application No. PCT.US2007/076751, dated Dec. 6, 2007.
International Search Report, for PCT Application No. PCT/US2005/008504, dated Jun. 9, 2005.
Great Britain Search Report, dated Aug. 16, 2004.
Office Action dated Mar. 17, 2009, U.S. Appl. No. 10/591,927, inventors Tillman Pulina et al.
Office Action dated Sep. 8, 2009, U.S. Appl. No. 10/591,927, inventors Tillman Pulina et al.
Helmut Teschner: "Druck & Medientechnik", 11. Auflage 2003, Band 14, Seiten 16-17.
Artikel "Fettsäuren", aus dem Chemielexikon Römpp Online, Version 3.16.
Hans-Ulrich Klör (Hrsg.): Lexikon Adipositas, 2001, Seite 130.
Artikel "Triglyceride" aus Wikipedia.
Kuksis et al. "Triglyceride Composition of Native and Rearranged Butter and Coconut Oils", Journal of the American Oil Chemists' Society, vol. 41, 1964, p. 201-205.
Bezard et al. "Triglyceride Composition of Coconut Oil", Journal of the American Oil Chemists' Society, vol. 48, 1971, p. 134-139.
R. Gaita, Food and Beverage, 2002, p. 21.
Römpp-Lexikon "Lacke und Druckfarben", 1998, Seiten 419-421.
H. Kittel: Lehrbuch der Lacke und Beschichtungen, 2. Auflage 1998, Band 1, Seiten 185-190.
Produktinformation Captex 300.
European Search Report, Issued for corresponding PCT Application No. PCT/US2007/076751, dated May 8, 2009.
Helmut Teschner: Druck & Medientechnik [Printing and Media Technology], 11th edition, 2003, vol. 14, pp. 16-17.
Article "Fatty Acids" from Chemielexikon Römpp Online [Römpp's Online Chemical Lexicon], version 3.16, 2001.
Hans Ulrick Klör (ed.): Lexicon of Obesity, 2001, p. 130.
Article "Triglycerides" from Wikipedia (2011).
Kuksis et al. "Triglyceride Composition of Native and Rearranged Butter and Coconut Oils", J. Am. Chem. Soc. 41 (1964), pp. 201-205.
Bezard et al. "Triglyceride Composition of Coconut Oil", J. Am. Chem. Soc. 48 (1971) pp. 134-139.
R. Gaita, Food and Beverage (2002), p. 21.
Römpp's Lexicon "Lacquers and printing inks", 1998, pp. 419-421.
H. Kittel: "Textbook of Lacquers and Coatings", 1998, pp. 185-190.
Product Information Prochure on Captex® 300, 1997.

* cited by examiner

Primary Examiner — David W Wu
Assistant Examiner — Vu A Nguyen
(74) Attorney, Agent, or Firm — McKenna Long & Aldridge, LLP.

(57) ABSTRACT

An offset printing varnish, comprising a solvent, is provided. The solvent comprises at least one triglyceride with saturated monocarboxylic acid moieties, which solvent is preferably food safe.

20 Claims, No Drawings

SHEET-FED OFFSET PRINTING INKS AND VARNISHES COMPRISING NEW SOLVENTS

CROSS REFERENCE TO RELATED APPLICATIONS

This application is the United States national phase filing of the corresponding international application number PCT/US2007/076751, filed on Aug. 24, 2007, which claims priority to and benefit of U.S. Application No. 60/840,243, filed Aug. 25, 2006, which applications are hereby incorporated by reference in their entirety.

The present invention relates to novel low odour inks and varnishes useful for offset lithographic printing, especially sheet-fed offset lithographic printing.

Sheet-fed offset lithography is the dominant printing process for the printing of folding cartons for many purposes, including for use as food packaging. However, where an ink is to be used on food packaging, it was hitherto essential, from the point of view of customer's acceptance, that it should not contaminate the food or impact any unnatural odour to it. Moreover, there is an increasing tendency for legislation to prescribe very low levels of contaminants in foods and other matter, which could affect public health. Contamination, in this context, can result from migration of public health affecting components of an ink into the food stuff or other packaged material or from undesirable odours imparted to the packaged material by the ink.

The development of printing inks which can be used for sheet-fed offset lithography and which allow little or no migration of their components whilst being essentially odourless or having little odour was therefore an aim of research.

One of the main odorous components of offset inks is the solvent used. It is in the nature of offset lithography, that the solvent must be organic and insoluble in water. Many solvents having these properties are not only highly odorous but also many of them are toxic to a greater or lesser extent. The choice of solvents for this purpose is, therefore, highly restricted.

In DE 196 53 828 C2 a low migration printing ink with little odour containing a rosin modified phenolic resin and/or a maleic resin and/or a modified hydrocarbon resin and/or a rosin ester is described, which contains fatty acid esters of polyvalent alcohols with high sterically required space.

The subject of WO 2005/090498 A1 are low migration, low odour inks or varnishes, that comprise at least one water-insoluble ester of a polycarboxylic acid with an alcohol having at least 4 carbon atoms, also with high sterically required space.

The disclosure of WO 97/35934 is a vegetable-oil containing printing ink vehicle, which does not contain any volatile organic compound.

The approach to overcome the afore-mentioned problems according to the present invention is to use suited solvents that are food safe and hence do not show toxic or malodorous effects, so that their migration properties are not important for their use.

According to the prior art solvents for use in varnishes and respective sheet-fed offset printing are to be sterically hindered molecules which do not migrate, i.e. which cannot contaminate packaged food because of being immobile. The used compounds are quite complex as to there chemical structure.

It is therefore a desire for providing solvents suited to be used in varnishes/printing inks for offset printing, especially sheet-fed offset printing, comprising compounds which are not restricted to the condition of being sterically hindered and which are, moreover, food safe.

This object is solved by the subject-matter claimed according to the present invention. It has surprisingly been found that a class of compounds, namely certain triglycerides based on saturated aliphatic monocarboxylic acids, are useful as solvents for offset printing inks and varnishes, especially sheet-fed offset printing inks and varnishes and are capable to give a number of improvements over the known inks including equivalent or lower odour or equivalent or improved stability on the press, without requiring the property of low migration, since those compounds are food safe (see e.g. "N. Weber et al., *UGB-Forum* 4/2002, pages 183-186", "K. Mukherjee, *Forschungs Report*, 1/1998, pages 38-41").

Thus, the present invention consists of an offset printing ink or varnish, particularly useful in sheet-fed offset lithographic printing, characterised in that the solvent comprises at least one water-insoluble triglyceride with saturated monocarboxylic acid moieties, preferably comprising from 5 to 22 carbon atoms.

The triglyceride as defined above is food safe, preferably the same applies to all components present in the solvent.

The term "food safe" means that the compound is health safe, not toxic and can be ingested without being detrimental to the human body.

The term "saturated monocarboxylic acid moiety", as defined herein, means a residue of the following type:
—C(O)-Alkyl$_{saturated}$,
e.g. Acetyl (—C(O)—CH$_3$) as a "saturated monocarboxylic acid moiety having two carbon atoms" or Capryl (—C(O)—C$_7$H$_{15}$) as a "saturated monocarboxylic acid moiety having eight carbon atoms".

When using compounds containing unsaturated acid moieties, the odour of the resulting inks and varnishes increases, which is not desirable.

Since the oxidative drying process and the by-products generated by it are an important source of odour development in finished prints, a careful selection of raw materials is necessary. According to a preferred embodiment of the invention driers as well as raw materials with oxidative drying potential (as used in conventional sheet-fed offset printing inks) are absent from the composition.

Good rub resistance of the finished prints can be achieved by using the printing inks according to the present invention together with a water based overprint varnish (OPV).

The general composition of printing inks or varnishes for offset lithographic printing, including sheet-fed offset lithographic printing, is well known, and is described in considerable detail in, for example, "R. H. Leach et al., *The Printing Ink Manual, 5th edition*, 1993, pages 342-452" and in U.S. Pat. No. 5,382,282, U.S. Pat. No. 5,725,646 and U.S. Pat. No. 6,489,375, included herewith by reference.

In general terms, a lithographic printing ink should have a low surface tension, be water-repellent, be capable of emulsifying with a fount solution, and, for conventional sheet-fed offset lithography, must be capable of drying without radiation. These very particular requirements are met by careful formulation and choice of the various components and are known in the printing ink industry.

The solvent used in the ink or varnish composition of the present invention comprises at least one water-insoluble triglyceride with saturated monocarboxylic acid moieties having from 6 to 22 carbon atoms. The corresponding monocarboxylic acids are aliphatic and have only one carboxylic acid group which forms an ester group with glycerol.

The three acid residues bound via ester groups to the glycerol can be the same or different.

Examples of aliphatic monocarboxylic acids include valeric acid (5 carbon atoms), caproic acid (6 carbon atoms), oenanthic acid (7 carbon atoms), caprylic acid (8 carbon atoms), pelargonic acid (9 carbon atoms), capric acid (10 carbon atoms), lauric acid (12 carbon atoms), myristic acid (14 carbon atoms), palmitic acid (16 carbon atoms), stearic acid (18 carbon atoms), arachidic acid (20 carbon atoms) and behenic acid (22 carbon atoms).

Preferably, the triglyceride is a so called MCT (medium chained triglyceride).

More preferably, the saturated monocarboxylic acid moieties each have independently 8 to 10 carbon atoms and most preferably 8 and/or 10 carbon atoms.

In the latter and the most preferred case, the inks or varnishes according to the present invention comprise solvents that comprise at least one of the following compounds:
2,3-bis(octanyloxy)propyl octanoate
2,3-bis(octanyloxy)propyl decanoate
2-(decanyloxy)-3-(octanyloxy)propyl octanoate
2-(decanyloxy)-3-(octanyloxy)propyl decanoate
3-(decanyloxy)-2-(octanyloxy)propyl decanoate
2,3-bis(decanyloxy)propyl decanoate Commercial examples for triglycerides or mixtures thereof that can be used in the present invention are Crodamol® GTCC by Croda, Witafrol® 7420 by Huls AG, Myritol® 312 by Cognis, Rotefan® GTCC by Ecogreen Oleochemicals or Raidiamuls® 2106 by Oleon.

Although the triglyceride may be used as the only solvent in the compositions according to the present invention, which is most preferred, also further suited solvents may be used, for example for achieving particular rheological properties, provided that they are also food safe. A solvent other than a triglyceride may optionally be present in the compositions in a maximum amount of 60% by weight, based on the total amount of solvent used. More preferably, from 45% to 90% by weight, still more preferably from 50% to 80%, and most preferably from 55% to 65% by weight of the solvent consists of the triglyceride.

In a special embodiment of the present invention the at least one triglyceride is the sole solvent.

Preferably the triglyceride solvent according to the present invention is present in a varnish in an amount of from 34 to 70% by weight, based on the total weight of the varnish, more preferably in an amount of from 38 to 60% by weight and most preferably in an amount of from 42 to 56% by weight.

In an especially preferred embodiment of the present invention the varnish comprises the following components (in % by weight of the varnish):

| | |
|---|---|
| Triglyceride with saturated monocarboxylic acid moieties | 38-60 |
| Alkyd resin | 0-25 |
| Ester of hydrogenated rosin | 0-25 |
| One or more phenolic modified rosin resins | 0-45 |
| One or more maleic resins | 0-30 |
| One or more phenolic free rosin resins | 0-45 |
| Gelling agent | 0-2 |

Preferably the triglyceride solvent is present in an ink according to the present invention in an amount of 30 to 45% by weight, more preferably in an amount of 32 to 43% by weight and most preferably in an amount of 34 to 41% by weight, based on the total weight of the printing ink composition.

The solvent, or mixture of solvents, used according to the present invention preferably has a melting point such that it is liquid at the temperature at which the printing ink or varnish is to be used. Hence, it should be liquid at the temperature of the printing press, and preferably even at ambient temperature, e.g. at temperatures above 10 to 5° C. In some cases, for example if the printing ink or varnish is to be used only in warm atmospheres, it may be possible that the solvent is solid at the mentioned ambient temperatures, provided that it melts at a somewhat higher temperature, such as at 25° C.

The resin component in a lithographic printing ink composition or varnish functions, among other things, as a film former to bind the varnish and pigment together and, when the ink or varnish dries, to bind the same to the receiving substrate. The resin component also contributes to the properties of hardness, gloss, adhesion and flexibility of an ink and must be compatible with the solvent component of the varnish. In conventional oleoresinous systems, the resin component commonly comprises a first or hard resin component and a second resin component which typically is an alkyd or polyester resin, but which can comprise various other compositions and resins as well.

Hard resins usable in the lithographic inks or varnishes of the present invention include, for example, natural or processed resins such as rosins, rosin esters, maleic modified resins, rosin modified fumaric resins, dimerized and polymerised rosins, phenolics, rosin modified phenolics, terpenes, polyamides, cyclised rubber, acrylics, hydrocarbons and modified hydrocarbons. Also included among the available resins are those identified in "*The Printing Ink Manual*", supra, the content of which is incorporated herein by reference.

The lithographic inks of the present invention will usually include at least one pigment, the nature of which is not critical to the present invention, and which may be chosen from any of those pigments well known to those skilled in the art. Alternatively, the ink may include an extender. Varnishes will not normally include any pigment or extender in their composition.

Procedures

To produce a test varnish, ⅔ of the capryl/caprate glycerine ester were added to a reaction vessel, stirred and heated to 180° C. Then possible other liquid components—alkyd or hydrogenated rosin ester—and the hard resins were added, ensuring that the temperature did not fall below 160° C. The mixture was heated up to 180° C. and held at that temperature for 60 minutes. Then the remaining part of the ester solvent was added and the mixture was allowed to cool to 160° C. In case of a non gelled varnish the varnish is further cooled down to room temperature.

In case of a gelled varnish (example 3) the gelling agent was then added with quick stirring and the whole varnish was heated to 180° C. and maintained at that temperature for 30 minutes. External cooling then reduced the temperature to 110° C. and the varnish was discharged from the reaction vessel.

The inks were prepared using the following method. The pigment(s) and other solid components (except the polyethylene wax) were dispersed in the varnish and the mixture was thoroughly mixed with a triple roller mill. The polyethylene wax was then added and the mixture was again passed over the triple roller mill for de-aerating. The viscosity and tack were adjusted, prior to de-aerating, by addition of small amounts of the capryl/caprate glycerine ester, to give the final composition shown in Table 1.

TABLE 1

| Process Ink Set: | | | | | |
|---|---|---|---|---|---|
| Trade Name | Supplier | Yellow | Magenta | Cyan | Black |
| Radiamuls 2106 | Oleon | 9.5 | 10.0 | 9.0 | 7.0 |
| Varnish 3 | Sun Chemical | 66.7 | 61.7 | 65.2 | 49.0 |
| Setalin V 414 | Hexion | 8.0 | 9.0 | 7.0 | 12.0 |
| Zeolite Pulver 4A | A + E Fischer | 0.8 | 0.8 | 0.8 | 8.0 |
| Superslip 6515XF | Micro Powders | 0.8 | 0.8 | 0.8 | 0.8 |
| BHT | Helm AG | 0.2 | 0.2 | 0.2 | 0.2 |
| Aluminum Silicate ASP 170 | Engelhardt | 3.0 | | | |
| Sunbrite Yellow 2125 | Sun Chemical | 11.0 | | | |
| Sym. Brill Carmin 6B308 | DIC | | 9.5 | | |
| Sym. Brill Carmin 6B303 | DIC | | 8.0 | | 1.0 |
| Fastogen Blue 5375 SD | DIC | | | 17.0 | 2.0 |
| Spezialruss 250 | Degussa | | | | 20.0 |
| | | 100.0 | 100.0 | 100.0 | 100.0 |

Preparation of Printed Material

Test prints were produced on a Heidelberg MO 4-colour press including a unit for application of water-based overprint varnishes. Press speed was between 7000-9000 sheets/hour, using a fountain solution containing 6-9% by volume isopropanol. Printing was carried out with standard optical densities, yellow=1.35, magenta=1.50, cyan=1.40 and black=1.80, using Fuji plates and Astral Premium blankets. The substrate used was Invercote G, which is a standard substrate for packaging. Prints were produced using a water-based overprint varnish. Samples for analysis were wrapped in aluminium foil 24 hrs after printing.

Robinson Test

The odour and taint caused by the inks of the present invention were tested by the well known Robinson test.

This is a test originally devised by the Technical Committee of the International Office of Cocoa and Chocolate to determine whether odours from packaging materials are transferred to cocoa and chocolate products. It is now also used more generally to check on the odour and taint likely to transfer from packaging materials used in the food industry. The test was carried out as follows:

A petri dish containing about 25 g of fresh grated milk chocolate was placed in a clean 1 litre preserving jar. 16 representative round samples (9 cm diameter, total area of the 16 samples 1017 cm2) of the packaging material to be evaluated were placed in the jar, so that sample and chocolate were not in contact with one another. A jar, the "blank", in all respects similar, but without any sample and a jar with unprinted substrate were also prepared. The jars were closed with a lid. They were then stored for 24 hours in a dark, odourless place at 23° C. A panel of tasters then compared the odour and the flavour of the chocolate in each sample jar with the chocolate in the blank. The results were evaluated on the following scale:

0=no difference in odour/flavour
1=odour/flavour difference just perceptible
2=noticeable change in odour/flavour
3=significant change in odour/flavour
4=intense change in odour/flavour Four-colour (black, cyan, magenta, yellow) prints were produced by printing as described above and were then tested. The sets of inks used were:

set A, standard offset inks, Irocart Process Inks, a set of currently available Sun Chemical conventional sheetfed offset inks containing driers;
set B, Irocart GN Low Hex ink, a set of currently available Sun Chemical conventional sheetfed offset inks formulated for low odour and low taint;
set C, the inks of table 1. The results are shown in Table 2 below.

TABLE 2

| Sample | Odour rating | Taint rating |
|---|---|---|
| Blank | 0 | 0 |
| Blank substrate | 0.5 | 0 |
| Set A | 3.5 | 3.0 |
| Set B | 0.5 | 0.5 |
| Set C | 0.5 | 0.0 |

In the following examples the components (amounts in % by weight) were mixed to form varnishes (Examples 1-5) or inks (Examples 6-7):

EXAMPLE 1

Varnish 1

| Trade name | Supplier | Chemical description | wt.-% |
|---|---|---|---|
| Rofetan ® GTCC | Deutsche Hydrierwerke | Capryl/caprate glycerine ester | 44 |
| Foralyn ® D | Eastmann Chemicals | Hydrogenated rosin ester | 16 |
| Tergraf ® 902 | Cray Valley | Phenolic modified rosin esters | 40 |
| | | | 100 |

EXAMPLE 2

Varnish 2

| Trade name | Supplier | Chemical description | wt.-% |
|---|---|---|---|
| Radiamuls ® 2106 | Oleon | Capryl/caprate glycerine ester | 44 |
| Setalin ® V414 | Hexion | Coconutoil alkyd resin | 16 |
| Tergraf ® 902 | Cray Valley | Phenolic modified rosin esters | 40 |
| | | | 100 |

EXAMPLE 3

Varnish 3

| Trade name | Supplier | Chemical description | wt.-% |
|---|---|---|---|
| Rofetan ® GTCC | Deutsche Hydrierwerke | Capryl/caprate glycerine ester | 47.2 |
| Setalin ® V414 | Hexion | Coconutoil alkyd resin | 16 |
| Tergraf ® 940 | Cray Valley | Phenolic modified rosin esters | 19 |
| Tergraf ® ZU 80 | Cray Valley | Phenolic modified rosin esters | 16 |
| Gelling agent 50408 | Sun Chemical | Gelling agent aluminum based | 1.8 |
| | | | 100 |

EXAMPLE 4

Varnish 4

| Trade name | Supplier | Chemical description | wt.-% |
|---|---|---|---|
| Rofetan ® GTCC | Deutsche Hydrierwerke | Capryl/caprate glycerine ester | 48 |
| Setalin ® V414 | Hexion | Coconutoil alkyd resin | 16 |
| Tergraf ® 902 | Cray Valley | Phenolic modified rosin esters | 18 |
| Tergraf ® 940 | Cray Valley | Phenolic modified rosin esters | 18 |
| | | | 100 |

EXAMPLE 5

Varnish 5

| Trade name | Supplier | Chemical description | wt.-% |
|---|---|---|---|
| Rofetan ® GTCC | Deutsche Hydrierwerke | Capryl/caprate glycerine ester | 54 |
| Foralyn ® D | Eastmann Chemicals | Hydrogenated rosin ester | 10 |
| Tergraf ® 902 | Cray Valley | Phenolic modified rosin esters | 18 |
| Tergraf ® 940 | Cray Valley | Phenolic modified rosin esters | 18 |
| | | | 100 |

EXAMPLE 6

Ink 1

| Trade name | Supplier | Chemical description | wt.-% |
|---|---|---|---|
| Varnish 2 | Sun Chemical | Varnish | 67.5 |
| BHT | Helm AG | BHT | 0.1 |
| Setalin V414 | Hexion | Coconutoil alkyd resin | 8 |
| Zeolithe powder 4A | A + E Fischer | Na—Al-Silicate | 0.6 |
| Superslip 6515XF | Micro Powders | Micronized polyamide wax | 0.8 |
| Symuler Brilliant Carmin 6B 308 | DIC | Pigment Red 57:1 | 9.5 |
| Symuler Brilliant Carmin 6B 303 | DIC | Pigment Red 57:1 | 8 |
| Rofetan ® | Ecogreen | Triglyceride with saturated-monocarboxylic acid moieties | 5.5 |
| | | | 100 |

EXAMPLE 7

Ink 2

| Trade name | Supplier | Chemical description | wt.-% |
|---|---|---|---|
| Varnish 3 | Sun Chemical | Varnish | 66.5 |
| BHT | Helm AG | BHT | 0.1 |
| Setalin V414 | Hexion | Coconutoil alkyd resin | 8 |
| Zeolithe powder 4A | A + E Fischer | Na—Al-Silicate | 0.6 |
| Superslip 6515XF | Micro Powders | Micronized polyamide wax | 0.8 |
| Symuler Brilliant Carmin 6B 308 | DIC | Pigment Red 57:1 | 9.5 |
| Symuler Brilliant Carmin 6B 303 | DIC | Pigment Red 57:1 | 8 |
| Radiamuls ® 2106 | Oleon | Triglyceride with saturated-monocarboxylic acid moieties | 6.5 |
| | | | 100 |

The invention claimed is:

1. An offset printing varnish solely consisting of food safe components comprising at least one triglyceride as solvent with saturated monocarboxylic acid moieties.

2. The offset printing varnish according to claim 1, wherein the offset printing varnish is a sheet-fed offset printing varnish.

3. The offset printing varnish according to claim 1, wherein the saturated monocarboxylic acid moieties each comprise independently from 5 to 22 carbon atoms.

4. The offset printing varnish according to claim 1, wherein the saturated monocarboxylic acid moieties each have independently 8 to 10 carbon atoms.

5. The offset printing varnish according to claim 1, wherein the saturated monocarboxylic acid moieties each have independently 8 and/or 10 carbon atoms.

6. The offset printing varnish according to claim 1, wherein the varnish comprises from 34% to 70% by weight of the triglyceride with saturated monocarboxylic acid moieties.

7. The offset printing varnish according to claim 1, wherein the varnish comprises from 38% to 60% by weight of the triglyceride with saturated monocarboxylic acid moieties.

8. The offset printing varnish according to claim 1, wherein the varnish comprises from 42% to 56% by weight of the triglyceride with saturated monocarboxylic acid moieties.

9. The offset printing varnish according to claim 1, comprising the following components (in % by weight)

| | |
|---|---|
| Triglyceride with saturated monocarboxylic acid moieties | 38-60 |
| Alkyd resin | 0-25 |
| Ester of hydrogenated rosin | 0-25 |
| One or more phenolic modified rosin resins | 0-45 |
| One or more maleic resins | 0-30 |
| One or more phenolic free rosin resins | 0-45 |
| Gelling agent | 0-2. |

10. An offset printing ink, comprising a varnish solely consisting of food safe components, said varnish comprising at least one triglyceride as solvent with saturated monocarboxylic acid moieties.

11. The offset printing ink according to claim 10, wherein the offset printing ink is a sheet-fed offset printing ink.

12. The offset printing ink according to claim 10, wherein the saturated monocarboxylic acid moieties each have independently from 5 to 22 carbon atoms.

13. The offset printing ink according to claim 10, wherein the saturated monocarboxylic acid moieties each have independently 8 to 10 carbon atoms.

14. The offset printing ink according claim 10, wherein the saturated monocarboxylic acid moieties each have independently 8 and/or 10 carbon atoms.

15. The offset printing ink according to claim 10, wherein the ink comprises from 30% to 45% by weight of the triglyceride with saturated monocarboxylic acid moieties.

16. The offset printing ink according to claim 10, wherein the ink comprises from 32% to 43% by weight of the triglyceride with saturated monocarboxylic acid moieties.

17. The offset printing ink according to claim 10, wherein the ink comprises from 34% to 41% by weight of the triglyceride with saturated monocarboxylic acid moieties.

18. A method for preparation of an offset printing varnish solely consisting of food safe components, comprising mixing at least one triglyceride with saturated monocarboxylic acid moieties with at least one hard resin usable in lithographic varnishes.

19. The method according to claim 18, further comprising mixing the offset printing varnish prepared thereby with other ingredients usable in lithographic printing inks to prepare a food safe offset printing ink.

20. The method according to claim 18, wherein the offset printing varnish is a sheet-fed offset printing varnish.

* * * * *